(12) United States Patent
Osada et al.

(10) Patent No.: US 8,460,401 B2
(45) Date of Patent: Jun. 11, 2013

(54) METHOD OF ATOMIZATION

(75) Inventors: Fumio Osada, Higashimurayama (JP); Shinya Fukuzawa, Higashimurayama (JP); Kazuyo Nagai, Hihashimurayama (JP)

(73) Assignee: Nikkiso Co., Ltd., Tokyo (JP)

( * ) Notice: Subject to any disclaimer, the term of this patent is extended or adjusted under 35 U.S.C. 154(b) by 395 days.

(21) Appl. No.: 12/742,539

(22) PCT Filed: Mar. 10, 2008

(86) PCT No.: PCT/JP2008/000520
§ 371 (c)(1),
(2), (4) Date: Aug. 16, 2010

(87) PCT Pub. No.: WO2009/063574
PCT Pub. Date: May 22, 2009

(65) Prior Publication Data
US 2011/0139887 A1    Jun. 16, 2011

(30) Foreign Application Priority Data
Nov. 14, 2007   (JP) ................................. 2007-296122

(51) Int. Cl.
*B01J 35/10*          (2006.01)

(52) U.S. Cl.
USPC .......................... 23/293 A; 23/295 R; 23/304

(58) Field of Classification Search
USPC ..................................... 23/293 A, 295 R, 304
See application file for complete search history.

(56) References Cited

U.S. PATENT DOCUMENTS
2008/0274275 A1    11/2008  Mishima et al.

FOREIGN PATENT DOCUMENTS
| EP | 1 842 586 A1 | 10/2007 |
| JP | 2004010499 A | 1/2004 |
| JP | 3754372 | 12/2005 |
| JP | 2006111798 A | 4/2006 |
| WO | 2006057374 A1 | 6/2006 |

*Primary Examiner* — Edward Johnson
(74) *Attorney, Agent, or Firm* — The Webb Law Firm

(57) ABSTRACT

An objective of the present invention is to provide a method of atomizing a substance poorly soluble in carbon dioxide in a supercritical state. The present invention relates to a method of atomization comprising: introducing a substance which is difficult to be atomized by use of only carbon dioxide in a supercritical state, water and carbon dioxide into a pressure vessel; applying heat and pressure to an interior of the pressure vessel to bring the carbon dioxide into a supercritical state; and returning a pressure of the interior to normal pressure.

6 Claims, 4 Drawing Sheets

Date 2007/10/23
Time 16:11:47
Acceleration voltage 5.00kV
W.D. 23.6mm
Magnification x5.00k
I.e. 98.0uA
Input signal SE
Data size 1280x960

10.0um

Date 2007/09/27
Time 14:44:44
Acceleration voltage 5.00kV
W.D. 23.3mm
Magnification x1.00k
I.e. 92.0uA
Input signal SE
Data size 1280x960

Date 2007/10/25
Time 16:58:22
Acceleration voltage 5.00kV
W.D. 21.0mm
Magnification x1.00k
I.e. 96.0uA
Input signal SE
Data size 1280x960

Conductive polymer: Before treatment

Conductive polymer: After treatment

METHOD OF ATOMIZATION

TECHNICAL FIELD

The present invention relates to a method of atomization, more particularly a method of atomizing a substance that is difficult to be atomized by the use of only carbon dioxide in a supercritical state.

BACKGROUND ART

Conventionally, substances poorly soluble in carbon dioxide in a supercritical state are not capable of being atomized by an atomization method using carbon dioxide in a supercritical state. It is because the conventional atomization method using carbon dioxide in a supercritical state requires dissolving the substances to be atomized in supercritical carbon dioxide fluid as the condition thereof.

A conventional apparatus of forming fine particles by utilizing carbon dioxide in a supercritical state is equipped with mixed solvent preparing means for mixing liquefied carbon dioxide and a dissolution-facilitating solvent, in a predetermined proportion of the former to the latter to prepare a mixed solvent; solution preparing means for making the mixed solvent in a supercritical state and dissolving a substance in the mixed solvent; and spraying means, communicating with the solution preparing means, for spraying the solution prepared in the solution preparing means. (See claim 1 of Patent document 1.)

Reference 1 includes the following explanation about the 'dissolution-facilitating solvent' used in the apparatus: "The dissolution-facilitating solvent is a solvent that is added to carbon dioxide to enhance the solubility of a substance poorly soluble in carbon dioxide in a supercritical state. The use of a dissolution-facilitating solvent to improve solubility of a substance is known. If a substance has a larger solubility in a mixed solvent of carbon dioxide in a supercritical state and an added solvent than in sole carbon dioxide in a supercritical state, the added solvent could be a dissolution-facilitating solvent. The dissolution-facilitating solvent may be called 'solvent aid', because it helps a substance dissolve in carbon dioxide in a supercritical state. Examples of the dissolution-facilitating solvent may include acetone, methanol and methylene chloride. A solvent appropriate for a substance to be dissolved is properly selected and used." (See paragraph 0019 of Patent document 1.)

The apparatus of preparing fine particles disclosed in Patent document 1 is considered to be appropriate to atomization of medicaments. (See paragraphs 0002 and 0025 of Reference 1.)

Patent document 2 discloses "a method of atomization comprising mixing carbon dioxide to be brought into a supercritical state and a solvent with a collected polymer; making the carbon dioxide in a supercritical state; keeping the carbon dioxide in the supercritical state for a predetermined time period; reducing the pressure, thereby removing the carbon dioxide; collecting a remaining liquid; and drying the liquid". (See claim 1 of Patent document 2.)

Patent document 2 states: "Examples of the solvent may include ethanol, n-butyl alcohol, THF which stands for tetrahydrofuran and should be understood as it hereinafter, xylene, etc. These solvents may be used singly, or two or more of them may be used together." (See paragraph 0009 of Patent document 2.)

The apparatuses disclosed in these patent documents use an organic solvent in addition to carbon dioxide, to atomize a substance with low solubility in carbon dioxide in a supercritical state. The organic solvent used with carbon dioxide is effused into the atmosphere when the pressure vessel containing a supercritical fluid is opened to the atmosphere. The use of an organic solvent is thus problematic from the viewpoint of environmental pollution. Collection of the used organic solvent in order to solve the problem of environmental pollution requires many steps, which makes the collection unpractical.

Patent document 1: Japanese Patent No. 3754372
Patent document 2: JP 2006-111798 A

DISCLOSURE OF THE INVENTION

[Problems to be Solved by the Invention]

An objective of the present invention is to provide a method of atomizing a substance which is difficult to be atomized by use of only carbon dioxide in a supercritical state, by the employment of solely carbon dioxide without using organic solvents. Another objective of the present invention is to provide a method capable of atomizing a substance which is difficult to be atomized by the use of only carbon dioxide in a supercritical state, to fine particles having a particle size from $1/100$ to $1/10$ of the original size, and of forming particles with a uniform particle size.

[Means to Solve the Problems]

Means to solve the problems is a method of atomization comprising introducing a substance which is difficult to be dissolved by use of only carbon dioxide in a supercritical state, water and carbon dioxide into a pressure vessel; applying heat and pressure to an interior of the pressure vessel to bring the carbon dioxide into a supercritical state; and returning a pressure of the interior to normal pressure.

[Advantages of the Invention]

The present invention provides a method of atomization capable of atomizing substances, including inorganic compounds, organic compounds and polymers, which are difficult to be dissolved by the use of only carbon dioxide in a supercritical state, to fine particles having a particle size from $1/100$ to $1/10$ of the original size wherein the obtained particles have a uniform particle size.

EXPLANATION OF REFERENCE NUMERALS

Figure 1:
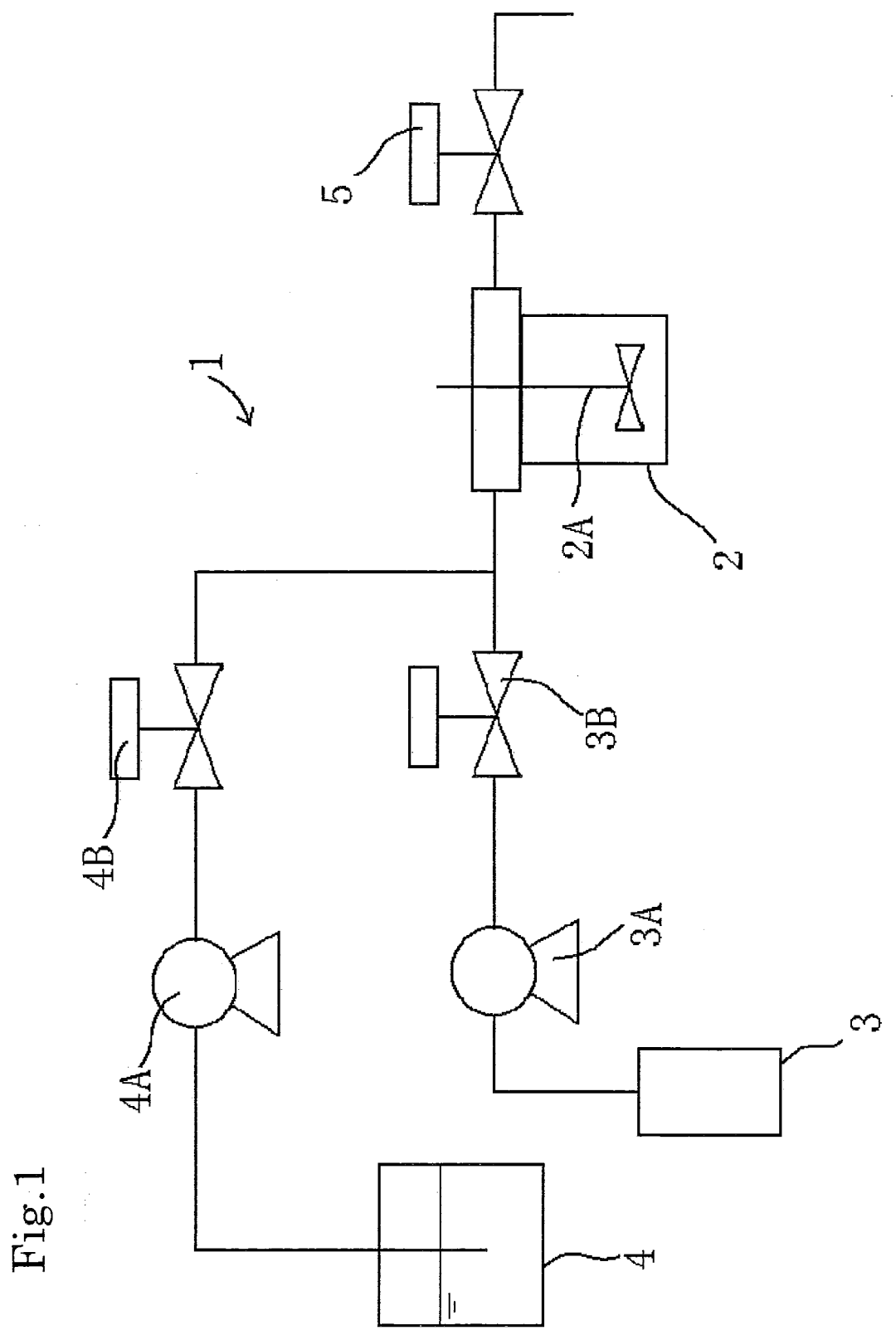
FIG. 1 is a schematic illustration of an atomizing apparatus capable of carrying out the method of atomization according to the present invention.

1 atomizing apparatus
2 pressure vessel
2A stirrer
3 carbon dioxide cylinder 3A first pump
3B first manual valve
4 water tank
4A second pump
4B second manual valve
5 third manual valve

BEST MODE TO CARRY OUT THE INVENTION

The method of atomization according to the present invention is characterized by introducing a substance which is difficult to be atomized by use of only carbon dioxide in a supercritical state, water and carbon dioxide into a pressure vessel; applying heat and pressure to the interior of the pressure vessel to bring the carbon dioxide into a supercritical state; and returning the pressure of the interior to normal pressure.

The substance which is difficult to be atomized by use of only carbon dioxide in a supercritical state may include inorganic compounds poorly soluble or insoluble in carbon dioxide in a supercritical state, organic compounds poorly soluble or insoluble in carbon dioxide in a supercritical state, and polymers poorly soluble or insoluble in carbon dioxide in a supercritical state. It is difficult to atomize these inorganic compounds, organic compounds and polymers by the use of only carbon dioxide in a supercritical state.

Preferable examples of the inorganic compounds may be those used as raw materials for cosmetics. Specific examples may include talc, sericite, mica, silicic anhydride, boron nitride, synthesized mica, titanium oxide, red iron oxide, yellow oxide, black oxide of iron, titanated mica, black oxide of titanium, Prussian blue pigments (ferric ammonium ferrocyanide), ultramarines, chromium oxide, chromium hydroxide, zinc oxide, aluminum powder, calcium carbonate, and barium sulfate. These inorganic compounds are recited on page 512 of "the Handbook of Particle Technology, the 2nd edition", edited by the Society of Powder Technology, published on Mar. 30, 1998 by the Nikkan Kogyo Shimbun, Ltd.

Inorganic compounds which are difficult to be atomized by use of only carbon dioxide in a supercritical state and to which the present application may also suitably be applied include magnesium carbonate, magnesium sulfate, and titanium chloride. Generally speaking, the inorganic compounds may include oxides, carbonates, sulfates and chlorides of the elements belonging to Group 2 of the periodic table included in the revised edition (published in 1989) of IUPAC Nomenclature of Inorganic Compounds, such as Mg, Ca and Ba; oxides and chlorides of the elements belonging to Group 4 of the periodic table, such as Ti; and oxides and chlorides of the elements belonging to Group 12 of the periodic table, such as Zn.

According to the method of the present invention, fine particles of an inorganic compound whose average particle size is from 1/100 to 1/10 of the original size, for example 0.1 μm or less, about 1 μm or less in some cases, are produced. Although it is difficult to provide a theoretical explanation of why such inorganic compounds are atomized by this method, our surmise is as follows: When the temperature and pressure of liquefied carbon dioxide is changed under the conditions where carbon dioxide is brought into a supercritical state, the density thereof is changed while it maintains properties of liquid, which means that liquefied carbon dioxide also has properties of gas. On the other hand, the density of water seldom changes under these conditions. When water is allowed to act on carbon dioxide under these conditions, or two liquids having different densities are mixed under supercritical conditions, molecular movements, including rotations and collisions between water molecules and carbon dioxide molecules whose dispersibility is high and therefore which diffuse into the water molecules well, are greatly affected by a solute, or a dissolved inorganic compound. As a result, the mixture of carbon dioxide in a supercritical state and water behaves something like a 'liquid pulverizer' that provides grinding and cutting of the inorganic compound. Apart from the theory, the method according to the present invention is a preferable method of atomizing inorganic compounds that are raw materials for cosmetics.

For the organic compounds poorly soluble or insoluble in carbon dioxide in a supercritical state may be used any organic compound, as long as it is poorly soluble or insoluble in carbon dioxide in a supercritical state. In particular, organic compounds used as raw materials for cosmetics are preferable. The organic compounds may include ultraviolet absorbers, such as 2-ethylhexyl p-methoxycinnamate, 2-ethyloctyl p-methoxycinnamate, 2-ethylhexyl p-dimethylaminobenzoate, 2-ethyloctyl p-dimethylaminobenzoate, 2-ethylhexyl salicylate, 2-ethyloctyl salicylate, 4-tert-butyl-4-methoxybenzoyl methane, methoxydibenzoylmethane, and others.

The method according to the present invention is capable of changing the shape of a target organic compound from a needle-like shape to a sphere-like shape, and producing fine particles having an average particle size from 1/100 to 1/10 of the average particle size of the original organic compound. Although the reason why such technical advantages are achieved has not been elucidated sufficiently, it is amazing that poorly soluble organic compounds are atomized by carbon dioxide in a supercritical state and water.

Polymers poorly soluble or insoluble in carbon dioxide in a supercritical state are often poorly soluble or insoluble in water. Examples of the polymers to which the method of the present invention is applicable may include polymers used in the binders for toners of copy machines and printer inks. Specific examples may include polymers such as methyl acrylate polymer, polystyrene and polycarbonate. Polymers also capable of being atomized by the method of the present invention may include polystyrene sulfonic acid and alkaline or alkaline earth salts thereof, and conductive polymers made through the bonding of polystyrene sulfonic acid with organic compounds, such as polyethylenedioxythiophene (PEDT) and polypyrrole (PPY), capable of forming electrovalent bonds with $—SO_3^-$ ions included in molecules of the polystyrene sulfonic acid. Polystyrene sulfonic acid and alkaline or alkaline earth salts thereof could be used as a medicament effective in the treatment of hyperkalemia caused by acute or chronic renal failure. Therefore polystyrene sulfonic acid and alkaline or alkaline earth salts thereof atomized to, for example nano-order fine particles by the method of the present invention are suitable for percutaneous administration. With regard to the conductive polymers, they become more conductive compared with the same amount of the polymers in the shape of a chunk, as the particle size of the particles thereof becomes smaller.

Among the polymers to which the method of the present invention is applicable, conductive polymers, made by the bonding of polystyrene sulfonic acid with organic compounds, such as polyethylenedioxythiophene (PEDT) and polypyrrole (PPY), capable of forming electrovalent bonds with the $—SO_3^-$ groups included in molecules of the polystyrene sulfonic acid, swell with water to form water-swollen polymers. These water-swollen polymers have ionic functional groups $—SO_3^-$ in the molecules thereof, which are capable of bonding with water molecules, thereby we think swelling the polymers with water. When carbon dioxide is brought into a supercritical state in the presence of water and the water-swollen polymers by the method of the present invention, the liquefied carbon dioxide has a density close to a density of the gas while keeping the properties of liquid, which brings the liquefied carbon dioxide into a state in which it easily permeates into the polymers. When the carbon dioxide permeates into and passes through the swollen polymers, water molecules penetrate into the polymers together with the carbon dioxide. Thereafter, the pressure in the pressure vessel is returned to normal pressure, which results in the situations where the carbon dioxide vaporizes in a moment and the volume of the water increases. The water with an increased volume remaining in the swollen polymer molecules after the carbon dioxide in the form of gas escapes from the molecules cuts principal chains of the water-swollen polymers to form water-swollen polymers in the shape of fine particles. Among the water-swollen polymers, crystalline water-swollen polymers with the principal chains being oriented are apt to allow the water to cut the principal chains thereof. Therefore crystalline water-swollen polymers are easily atomized by the method of the present invention. Examples of the water-swollen polymers, other than the polymers mentioned above, may include polystyrene sulfonic acid and alkaline or alkaline earth salts thereof, the same compound with ionic bonds, and polyaniline sulfonic acid and alkaline or alkaline earth salts thereof.

There is no special limitation on carbon dioxide to be brought into a supercritical state, and ordinary carbon dioxide gas may be used. This carbon dioxide gas is obtainable at a low cost. It is also safe, which is advantageous because it causes no particular problem if carbon dioxide in a supercritical state is returned to a normal state under ordinary pressure and released into the atmosphere.

The water to be supplied into the pressure vessel should preferably be water without impurities. Examples of such water may include distilled water, ion-exchanged water, pure water and extrapure water.

The method of this invention requires introducing carbon dioxide, water, and a target substance which is at least one of the inorganic compounds, the organic compounds and the polymers into a pressure vessel. There is no limitation on the order of introducing carbon dioxide, water, and the target substance into the pressure vessel. It may be acceptable if water and the target substance are mixed prior to the introduction of them into the pressure vessel and subsequently the resultant mixture is placed in the pressure vessel.

The proportion of water to the target substance, or the at least one of the inorganic compound, the organic compound and the polymer, in the pressure vessel is generally from 50 to 25000 parts by mass, preferably from 50 to 10000 parts by mass, particularly preferably from 20 to 2000 parts by mass, to the part by mass of the target substance. When the amount of water exceeds the upper limit, the target substance may float on or in the water at a level corresponding to an upper part of the vessel, which does not let the reaction take place. On the other hand, when the amount of water is too small, the reaction may not proceed sufficiently.

The proportion of carbon dioxide to water in the pressure vessel is normally from 80 to 500 grams of carbon dioxide, preferably from 95 to 400 grams thereof, to 10 ml of water.

Water and a target substance, or at least one of the inorganic compound, the organic compound and the polymer are placed in a pressure vessel. Subsequently carbon dioxide is injected into the pressure vessel. Then, the conditions inside the pressure vessel are turned to those which bring carbon dioxide into a supercritical state. Normally, the interior of the pressure vessel is kept at a pressure from 10 to 15 MPa and a temperature from 40 to 100° C. Also, the time period to keep carbon dioxide in the pressure vessel in a supercritical state is normally from one to two hours.

After keeping the carbon dioxide inside the pressure vessel in a supercritical state for a predetermined time, the pressure inside the vessel is returned to normal pressure. In ordinary cases, the carbon dioxide in the pressure vessel is then released to the atmosphere. A mixture of the water and the target substance thus remains in the pressure vessel. The target is capable of being separated from the remaining by an ordinary separator such as a filter.

The resultant product has an average particle size of not more than $1/10$, from $1/100$ to $1/10$ in many cases, of the average particle size which the target substance had before it was placed in the pressure vessel. The average particle size of a target substance may be measured with a particle size distribution analyzer, such as a "Microtrac", a product of Nikkiso Co., Ltd.

We will generally explain the method of this invention, referring to the figures.

FIG. 1 shows a schematic illustration of an apparatus for atomizing a substance, an example suitable to carry out the present invention. As shown in FIG. 1, the apparatus for atomizing a substance 1 includes a pressure vessel 2, a carbon dioxide cylinder 3, a water tank 4 and a third manual valve 5.

The pressure vessel 2 should be a vessel capable of containing a target substance, or at least one of an inorganic compound, an organic compound and a polymer; water; and carbon dioxide, and capable of bringing carbon dioxide into a supercritical state. The pressure vessel 2 should be equipped with a stirrer 2A for stirring the contents therein. The third manual valve 5 is placed in an exhaust pipe attached to the pressure vessel 2.

Carbon dioxide gas is stored in the carbon dioxide cylinder 3, and is supplied to the pressure vessel 2 from the cylinder. The carbon dioxide cylinder 3 is placed prior to the pressure vessel 2, and communicates with the vessel. Between the carbon dioxide cylinder 3 and the pressure vessel 2, a second pump 4A and a first manual valve 3B are arranged in this order.

Pure water is stored in the water tank 4 and supplied to the pressure vessel from this tank. The water tank 4 is placed prior to the pressure vessel 2 and communicates with the vessel. Between the water tank 4 and the pressure 2 are arranged a second pump 4A and a second manual valve 4B in this order.

Figure 2:
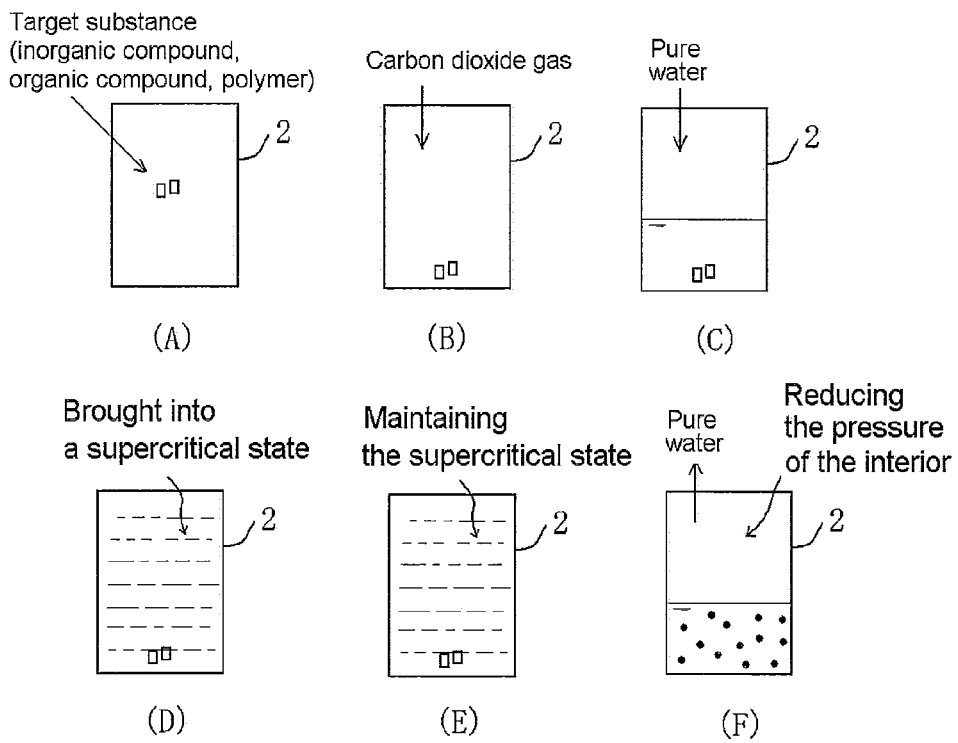
FIG. 2 is a schematic illustration showing the states inside a pressure vessel.

We will explain a method of atomization with the apparatus for atomizing a substance, referring to FIGS. 1 and 2.

First, a target substance, such as an inorganic compound, is introduced into the pressure vessel 2. (See FIG. 2(A).)

Then, a first pump 3A and the first manual valve 3B are activated, so that carbon dioxide gas, which will be brought into a supercritical state, is supplied from the carbon dioxide cylinder 3 to the pressure vessel 2. (See FIG. 2(B).)

The second pump 4A and the second manual valve 4B are also activated, so that pure water is supplied from the water tank 4 to the pressure vessel 2. (See FIG. 2(C).) Either the pure water or the carbon dioxide gas may be supplied earlier than the other, or they may be supplied simultaneously.

Subsequently, the pressure and/or the temperature inside the pressure vessel is raised, which brings the supplied carbon dioxide gas into a supercritical state. If necessary, additional carbon dioxide gas is forced into the pressure vessel 2. During this stage, the stirrer 2A may be actuated, at the operator's discretion, to stir the carbon dioxide to be or being in a supercritical state and the pure water. (See FIG. 2(D).) Thereafter the carbon dioxide is kept in a supercritical state for a predetermined time. (See FIG. 2(E).)

The third manual valve 5 is operated, so that the carbon dioxide in a gaseous state is released from the pressure vessel 2 through the third manual valve 5 to the atmosphere. The pressure inside the pressure vessel 2 is thus reduced and returned to normal pressure. Water and the target substance, such as an inorganic compound, remain in the pressure vessel 2. The resultant target substance, such as an inorganic compound, is separated and collected from the mixture of the water and the substance in the pressure vessel 2 by a separator.

It is supposed that pure water itself is turned into a state similar to a supercritical state when carbon dioxide gas, which has been mixed with water and a target substance such as an inorganic compound, is brought into a supercritical state in the way depicted hereinbefore. Reduction in the pressure from a high pressure, which is called for to realize a supercritical state, to normal pressure returns carbon dioxide in a supercritical state to normal carbon dioxide gas. The method according to the present invention is capable of obtaining polymer fine particles from collected polymer.

EXAMPLES

The present invention will be described more specifically by means of working examples and comparative examples. The present invention is not limited to the contents of the working examples.

Working Example 1

As shown in FIG. 1, in a pressure vessel 2 whose inner volume was 500 mL were placed 0.05 g of calcium carbonate particles having an average particle size of 100 μm and 10 g of pure water.

The interior of the pressure vessel 2 was heated to 40° C., and 308 g of carbon dioxide gas was forced into the pressure vessel 2 so that the interior had a pressure of 10 MPa. The carbon dioxide gas that had been supplied to the pressure vessel 2 was thus brought into a supercritical state. During this process, the operator actuated a stirrer 2A to stir the carbon dioxide to be or being in the supercritical state and water at his/her discretion. Then, the carbon dioxide fluid in the supercritical state was kept for two hours.

After two hours, the third manual valve 5 was operated and the pressure inside the pressure vessel 2 was returned to normal pressure. When the interior of the pressure vessel 2 returned to normal pressure, a mixture of water and calcium carbonate particles remained in the vessel 2. The mixture was taken out of the pressure vessel 2 and subjected to filtration. Calcium carbonate particles were thus collected.

Figure 3:
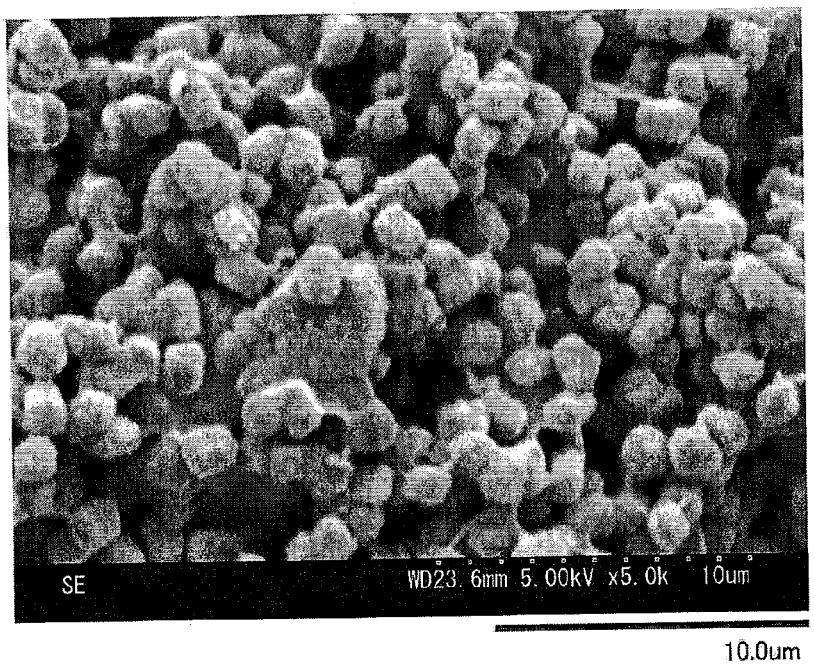
FIG. 3 is a SEM image of fine particles after application of the method according to the present invention.

The collected calcium carbonate particles were dried. Then, the dried particles were analyzed with a SEM. The analysis ensured that the resultant product contained spherical particles with a particle size of about 1 μm. The SEM photograph is shown in FIG. 3.

Comparative Example 1

The same steps as those of Working Example 1 were carried out, except that water was not used. As far as a SEM image analysis showed, calcium carbonate particles after the treatment by this method were not significantly different from calcium carbonate particles before the treatment. The particle size of the calcium carbonate particles was distributed from 100 μm to 200 μm.

Working Example 2

Figure 4:
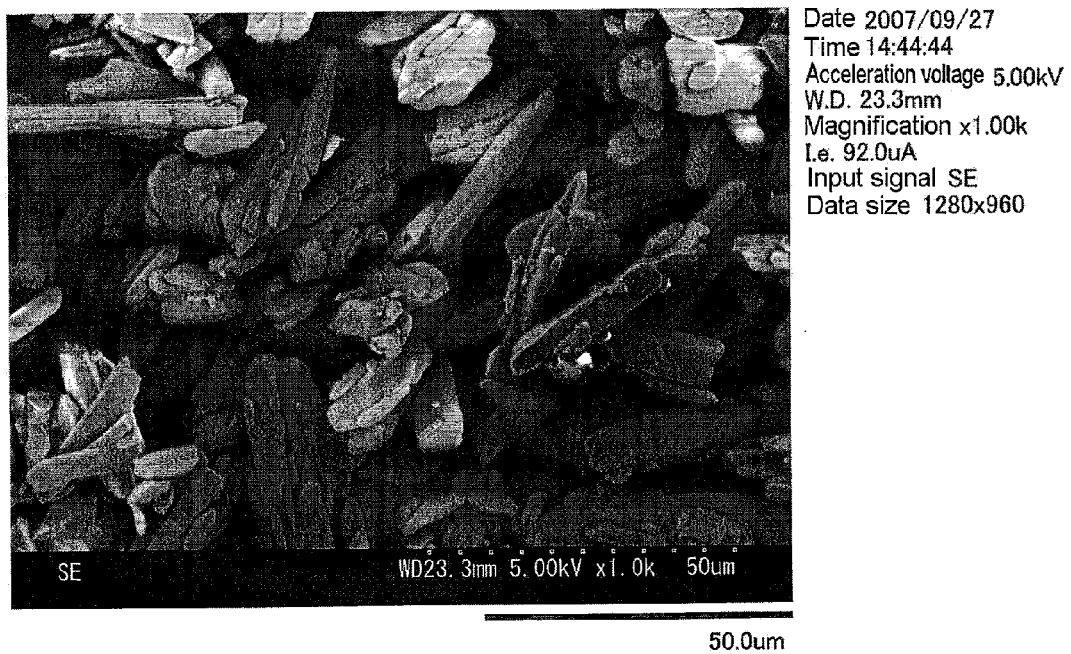
FIG. 4 is a SEM image of fine particles before application of the method according to the present invention.

The same steps as those of Working Example 1 were carried out, except that 0.1 g of methoxydibenzoylmethane particles each in the shape of a needle with an average axial length of about 100 μm, as shown in FIG. 4, was placed in the pressure vessel 2 instead of calcium carbonate particles, and the pressure inside the pressure vessel was raised to 15 MPa, instead of 10 MPa.

Figure 5:
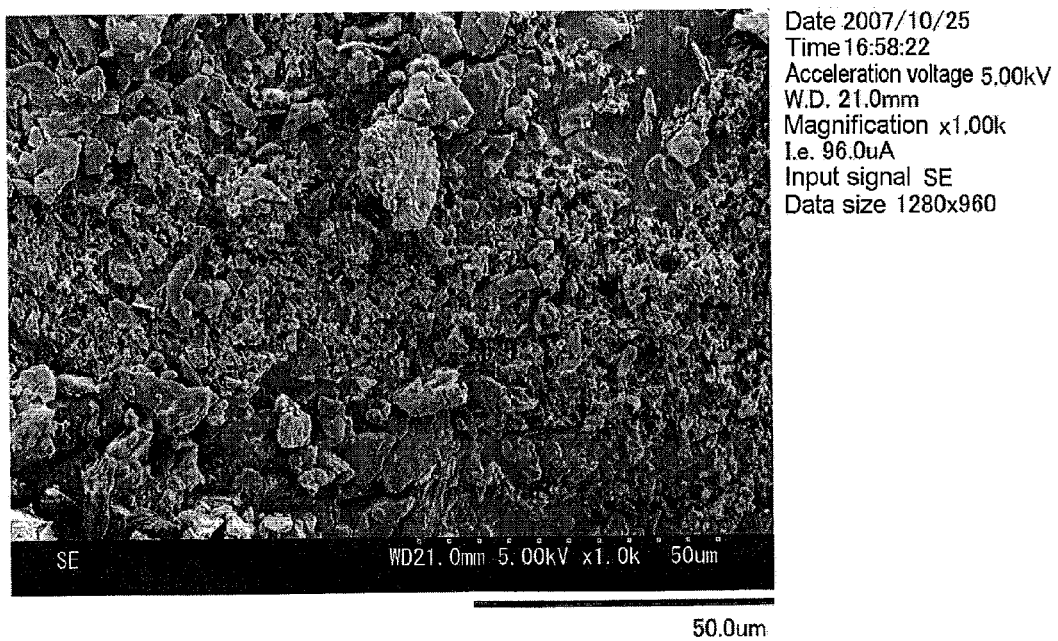
FIG. 5 is a SEM image of fine particles after application of the method according to the present invention.

A SEM image analysis of the collected methoxydibenzoylmethane particles ensured that they contained spherical particles with a particle size from 5 μm to 10 μm. The SEM photograph is shown in FIG. 5.

Methoxydibenzoylmethane was not atomized by the use of only carbon dioxide in a supercritical state. Even a process which includes adding methoxydibenzoylmethane to an alcohol, such as methanol, to prepare a mixture, adding carbon dioxide to the mixture and bringing the carbon dioxide into a super critical state failed to atomize methoxydibenzoylmethane. In view of these past failures, the fact that the method of the present invention succeeded in atomizing methoxydibenzoyl-methane is worthy of remark.

Working Example 3

Figure 6:
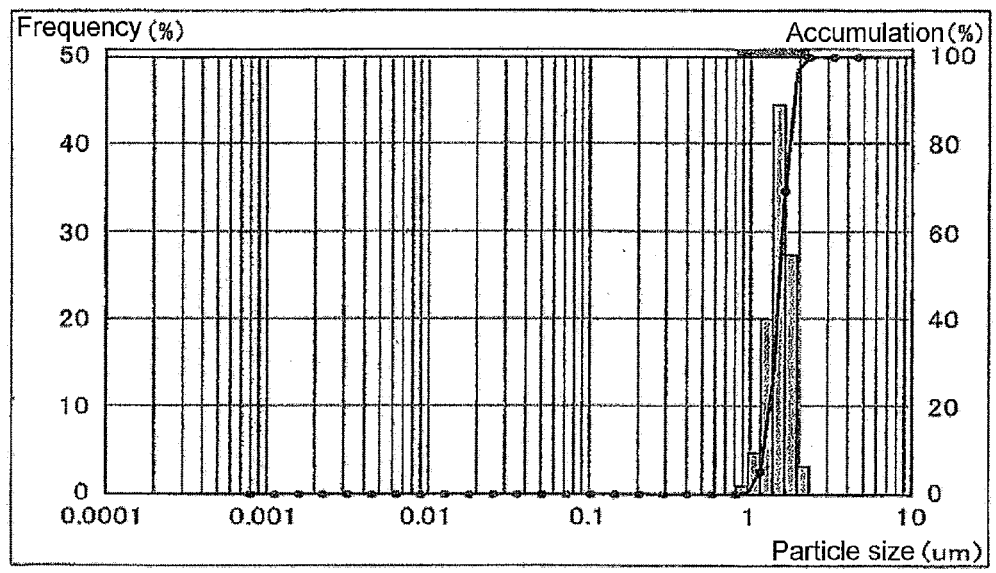
FIG. 6 is a graph showing the particle size distribution of particles of a conductive polymer before application of the method according to the present invention.

The same steps as those of Working Example 1 were carried out, except that instead of calcium carbonate particles, as the target substance, 0.0005 g of a conductive polymer in the form of particles made through ionic bonding of polystyrene sulfonic acid and polyethylene dioxythiophene, the conductive polymer having an average particle size of 0.4 μm, was placed in the pressure vessel 2. The particle size distribution of the conductive polymer particles prior to the placement in the pressure vessel 2 was measured with a particle size distribution analyzer, specifically a device named "Microtrac" produced by Nikkiso Co., Ltd. The result of the measurement is shown in FIG. 6.

Figure 7:
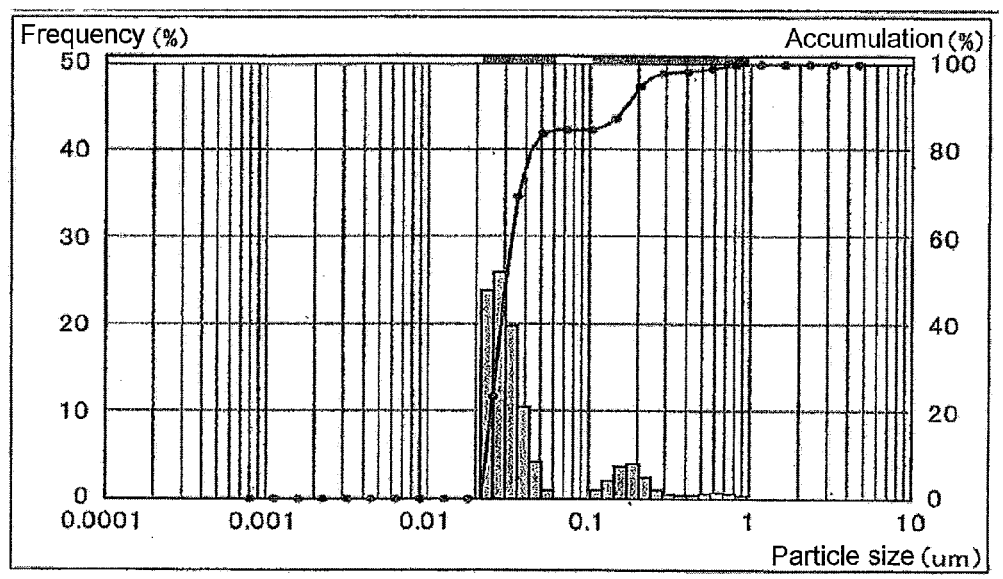
FIG. 7 is a graph showing the particle size distribution of particles of the conductive polymer after application of the method according to the present invention.

The particle size distribution of the conductive polymer particles collected after the treatment was measured with the particle size distribution analyzer, specifically a device named "Microtrac" produced by Nikkiso Co., Ltd. As a result, the average particle size was 0.05 μm. The particle size of the collected conductive polymer was distributed in a narrow range from 0.02 to 0.05 μm. The result of the measurement with the particle size distribution-measuring device is shown in FIG. 7.

We claim:

1. A method of atomization comprising:
   introducing an inorganic compound poorly soluble or insoluble in carbon dioxide in a supercritical state, water and carbon dioxide into a pressure vessel; applying heat and pressure to an interior of the pressure vessel to bring the carbon dioxide into a supercritical state; returning a pressure of the interior to normal pressure to produce a mixture of the water and atomized particles of the inorganic compound; and separating the atomized particles from the mixture.

2. The method of atomization according to claim 1, wherein the inorganic compound is a compound selected from the group consisting of oxides, carbonates, sulfates and chlorides of elements belonging to Group 2 of the periodic table; oxides and chlorides of elements belonging to Group 4 thereof; and oxides and chlorides of elements belonging to Group 12 thereof.

3. The method of atomization according to claim 1, wherein the inorganic compound is a compound selected from the group consisting of oxides, carbonates, sulfates and chlorides of Mg, Ca and Ba; oxides and chlorides of Ti; and oxides and chlorides of Zn.

4. The method of atomization according to claim 1, wherein the inorganic compound is a compound selected from the group consisting of talc, sericite, mica, silicic anhydride, boron nitride, synthesized mica, titanium oxide, red iron oxide, yellow oxide, black oxide of iron, titanated mica, black oxide of titanium, Prussian blue pigments (ferric ammonium ferrocyanide), ultramarines, chromium oxide, chromium hydroxide, zinc oxide, aluminum powder, calcium carbonate, and barium sulfate.

5. The method of atomization according to claim 1, wherein the atomized particles have a second average particle size of not more than $1/10$ of a first average size which the inorganic compound has before it is introduced into the pressure vessel.

6. The method of atomization according to claim 5, wherein the second average particle size is from $1/10$ to $1/100$ of the first average particle size.

* * * * *

UNITED STATES PATENT AND TRADEMARK OFFICE
CERTIFICATE OF CORRECTION

PATENT NO. : 8,460,401 B2  
APPLICATION NO. : 12/742539  
DATED : June 11, 2013  
INVENTOR(S) : Fumio Osada et al.

Page 1 of 1

It is certified that error appears in the above-identified patent and that said Letters Patent is hereby corrected as shown below:

Title Page, Item (75) Inventors, delete "Hihashimurayama" and insert -- Higashimurayama --

Signed and Sealed this  
Fifth Day of November, 2013

Teresa Stanek Rea  
*Deputy Director of the United States Patent and Trademark Office*

UNITED STATES PATENT AND TRADEMARK OFFICE
CERTIFICATE OF CORRECTION

PATENT NO.       : 8,460,401 B2  
APPLICATION NO. : 12/742539  
DATED            : June 11, 2013  
INVENTOR(S)      : Osada et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this
Eighth Day of September, 2015

Michelle K. Lee
*Director of the United States Patent and Trademark Office*